Patented Oct. 9, 1934

1,976,468

UNITED STATES PATENT OFFICE 1,976,468

MANUFACTURE OF POLYPHENYLS

William H. Williams, Midland, Mich., assignor to The Dow Chemical Company, Midland, Mich., a corporation of Michigan No Drawing. Application January 2, 1934,
Serial No. 705,032

7 Claims. (Cl. 260—168)

This invention concerns an improved method of manufacturing polyphenyls by pyrolyzing a mixture of benzene and diphenyl.

It is well known that benzene can be pyrolyzed at between 650° and 950° C. to form diphenyl along with a relatively small quantity of higher polyphenyls. In U. S. Patent No. 1,925,784 and in my copending application, Serial No. 648,654, filed December 23, 1932, I have described a method and apparatus for carrying out such reaction, wherein benzene vapors are pyrolyzed by being passed through electrically heated carbon or graphite tubes maintained at between 650° and 950° C. The velocity of gas flow is controlled so that between 5 and 20 per cent of the benzene is pyrolyzed at a single pass. The reaction products are condensed from the reacted vapors and separated by fractional distillation. The unreacted benzene is recycled in the process.

In practicing said method on a commercial scale, it is found that a certain amount of carbonization of the reaction mixture occurs with gradual deposition of carbon in the tubular heating elements. The carbon which is deposited gradually constricts the bore of said tubular elements, thereby disturbing the balance between the rate of vapor flow and power input, and may eventually cause complete stoppage of the gas flow. Accordingly, frequent shut-downs are necessary in order to remove the carbon deposits from the apparatus.

In another copending application, Serial No. 668,039, filed April 26, 1933, I have disclosed that the carbonization which usually occurs during pyrolysis of benzene to form diphenyl can largely be prevented by carrying such pyrolysis out in the presence of sulphur or a volatile sulphur compound. By operating in such manner, diphenyl can be manufactured continuously over a relatively long period of time without difficulty due to carbonization.

The object of the present invention is to produce the higher polyphenyls in good yield by pyrolyzing a mixture of benzene and diphenyl. It might be expected that diphenyl alone could be pyrolyzed to form higher polyphenyls by procedure similar to that employed in pyrolyzing benzene to form diphenyl, but when this is attempted it is found that the diphenyl is nearly completely carbonized and that the apparatus quickly becomes choked with carbon. I have found, however, that a mixture of benzene and diphenyl, containing not more than 20 per cent by weight of the latter, can be pyrolyzed in the presence of sulphur or a volatile sulphur compound to form the higher polyphenyls, e. g. triphenyls, tetraphenyls, etc., in good yield without carbonization occurring to appreciable extent. The invention, accordingly, consists in my improved method of making polyphenyls hereinafter fully described and particularly pointed out in the claims.

A liquid or vaporized mixture of benzene and diphenyl, containing not more than 20 per cent by weight of the latter, is treated with sulphur or a volatile sulphur compound, e. g. carbon bisulphide, hydrogen sulphide, sulphur dioxide, mercaptans, thiophenols, thiophene, etc., in such amount that the quantity of sulphur present represents at least 0.1 per cent, preferably between 0.15 and 0.5 per cent, of the combined weight of the benzene and diphenyl.

The resultant mixture is preferably preheated to a temperature approaching 650° C. by being passed, in vaporized form, over the outer extended surfaces of one or more electrically heated carbon, graphite, or graphitized carbon tubular heating elements. The vapors are then passed through said tubular heating elements, the inner surfaces of which are maintained at between 650° and 950° C. by controlling the electric current passing through the walls of the same, whereby the benzene and diphenyl vapors are pyrolyzed to form the desired polyphenyls along with an additional quantity of diphenyl. During such operation, the rate of vapor flow is controlled so that between about 5 and 20 per cent of the benzene and diphenyl vapors are pyrolyzed at a single pass. The exact rate of vapor flow to be employed varies with the size of apparatus used, the reaction temperature, etc. In any given apparatus and at any given reaction temperature, however, as the rate of vapor flow is decreased the proportion of material pyrolyzed is increased, but the danger of carbonization occurring becomes greater. Conversely, as the rate of vapor flow is increased, the proportion of material pyrolyzed at a single pass is lessened, but the danger of carbonization occurring is also lessened.

The reacted vapors are cooled to condense the liquefiable constituents, such as benzene, diphenyl, and higher polyphenyl products and the residual gases are vented. The benzene and diphenyl are distilled together from the higher polyphenyl products and recycled in the process, with the addition of sufficient benzene to make up for the higher polyphenyl products which were separated in the previous cycle, and also of sufficient sulphur or a volatile sulphur compound to replace any sulphur lost. During operation in the above manner, sufficient diphenyl is formed at each cycle to permit the process to be operated continuously without introducing additional diphenyl. However, diphenyl can be added at the successive cycles if desired, provided that the proportion of diphenyl in the reaction mixture is not built up to exceed 20 per cent of the combined weight of the benzene and diphenyl present. When the reaction mixture contains a higher proportion of diphenyl, carbonization occurs to an objectionable extent.

The polyphenyl products are obtained as a thick oil or wax, depending upon the particular conditions employed in carrying out the reaction. The major portion of said polyphenyls distills at between 121° and 250° C. at 6 millimeters pressure. The properties of the distillate are dependent to some extent upon the composition of the crude polyphenyl mixture and may vary somewhat from time to time. However, a typical sample of such distillate was found to have the specific gravity 1.15 at 15.5° C. It melted gradually over a wide temperature range, but was completely melted at 148° C., and solidified gradually over a wide temperature range but was completely solidified at 65° C. It had the flash point 172° C. and was stable against decomposition at temperatures as high as 425° C. Such distillate is well suited to use as a liquid heat transfer agent.

Although for the sake of clarity a specific mode of heating the reaction mixture to a pyrolyzing temperature has been described, the invention is not limited thereto, since other modes of heating, e. g. by means of an externally heated retort, by passing said mixture through a bath of molten salt, etc., may be employed.

The expression "volatile sulphur compound" as herein employed refers to any sulphur compound which becomes vaporized at a temperature below that employed in pyrolyzing benzene and diphenyl by the present method.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of making polyphenyls wherein a mixture of benzene and diphenyl is pyrolyzed by heating at between about 650° and about 950° C., the improvement which consists in maintaining in said mixture a sulphur content in excess of 0.1 per cent of the combined weight of benzene and diphenyl by adding thereto an agent selected from the class consisting of sulphur and volatile sulphur compounds before the mixture enters the pyrolyzing zone.

2. In a method of making polyphenyls wherein a mixture of benzene and diphenyl is pyrolyzed by heating at between about 650° and about 950° C., the improvement which consists in maintaining in said mixture a sulphur content in excess of 0.1 per cent of the combined weight of benzene and diphenyl by adding carbon bisulphide thereto before the mixture enters the pyrolyzing zone.

3. In a method of making polyphenyls, the steps which consist in preparing a vapor mixture of benzene, diphenyl, and an agent selected from the class consisting of sulphur and volatile sulphur compounds, in which mixture the proportion of diphenyl does not exceed 20 per cent of the combined weight of benzene and diphenyl and the proportion of the sulphur-containing agent is such that the sulphur content of the mixture represents at least 0.1 per cent of the combined weight of benzene and diphenyl, and heating said vapor mixture to between about 650° and about 950° C., whereby benzene and diphenyl are pyrolyzed to form higher polyphenyls.

4. In a method of making polyphenyls, the steps which consist in preparing a vapor mixture of benzene, diphenyl, and an agent selected from the class consisting of sulphur and volatile sulphur compounds, in which mixture the proportion of diphenyl does not exceed 20 per cent of the combined weight of benzene and diphenyl and the proportion of said sulphur-containing agent is such that the sulphur content of the mixture represents between about 0.15 and about 0.5 per cent of the combined weight of benzene and diphenyl, and passing said vapor mixture through a pyrolyzing zone maintained at between about 650° and about 950° C.

5. In a method of making polyphenyls, the steps which consist in preparing a vapor mixture of benzene, diphenyl, and an agent selected from the class consisting of sulphur and volatile sulphur compounds, in which mixture the proportion of diphenyl does not exceed 20 per cent of the combined weight of benzene and diphenyl and the proportion of said sulphur-containing agent is such that the sulphur content of the mixture represents between about 0.15 and about 0.5 per cent of the combined weight of benzene and diphenyl, passing the vapor mixture through a pyrolyzing zone maintained at between about 650° and about 950° C. at such velocity that between 5 and 20 per cent of the benzene and diphenyl mixture is pyrolyzed during passage through said zone, cooling the reacted vapors to condense benzene, diphenyl, and higher polyphenyls therefrom, venting off the residual gases, fractionally distilling the condensate to separate benzene and diphenyl from the higher polyphenyl products, and recycling the benzene and diphenyl through the steps described above.

6. In a method of making polyphenyls, the steps which consist in preparing a vapor mixture of benzene, diphenyl, and carbon bisulphide, in which mixture the proportion of diphenyl does not exceed 20 per cent of the combined weight of benzene and diphenyl and the proportion of carbon bisulphide is such that the sulphur content of the mixture represents between 0.15 and 0.5 per cent of the combined weight of benzene and diphenyl, passing the vapor mixture through a pyrolyzing zone in contact with carbon surfaces electrically heated to between about 650° and about 950° C., separating bezene and diphenyl from the higher polyphenyl products, and recycling the benzene and diphenyl through the steps described above.

7. In a method of making polyphenyls, the steps which consist in preparing a vapor mixture of benzene, diphenyl, and an agent selected from the class consisting of suphur and volatile sulphur compounds, in which mixture the proportion of diphenyl does not exceed 20 per cent of the combined weight of benzene and diphenyl and the proportion of said sulphur-containing agent is such that the sulphur content of the mixture represents between about 0.15 and about 0.5 per cent of the combined weight of benzene and diphenyl, and passing said vapor mixture through a tubular carbon heating element electrically heated to a temperature between about 650° and about 950° C.

WILLIAM H. WILLIAMS.